(12) United States Patent  
Hidano et al.

(10) Patent No.: US 8,562,223 B2  
(45) Date of Patent: Oct. 22, 2013

(54) FULL COMPLEMENT ROLLER BEARING PACKED WITH GEL-LIKE LUBRICANT

(75) Inventors: Kengo Hidano, Kanagawa-ken (JP); Shoji Nagao, Kanagawa-ken (JP); Shigmasa Itabashi, Kanagawa-ken (JP); Akihide Yanagitani, Kanagawa-ken (JP)

(73) Assignee: Nippon Thompson Co., Ltd., Tokyo (JP)

(*) Notice: Subject to any disclaimer, the term of this patent is extended or adjusted under 35 U.S.C. 154(b) by 0 days.

(21) Appl. No.: 13/402,154

(22) Filed: Feb. 22, 2012

(65) Prior Publication Data

US 2012/0230623 A1  Sep. 13, 2012

(30) Foreign Application Priority Data

Mar. 11, 2011 (JP) ................................. 2011-053984

(51) Int. Cl.  
*F16C 19/00* (2006.01)

(52) U.S. Cl.  
USPC ......................................................... 384/463

(58) Field of Classification Search  
USPC ..................... 384/463, 548; 508/551, 555  
See application file for complete search history.

(56) References Cited

U.S. PATENT DOCUMENTS

| 5,728,659 | A | * | 3/1998 | Naka et al. | 508/552 |
| 2009/0069203 | A1 | * | 3/2009 | Takezaki et al. | 508/100 |
| 2011/0251113 | A1 | * | 10/2011 | Daegling | 508/506 |

FOREIGN PATENT DOCUMENTS

| JP | 46-9082 | | 8/1971 |
| JP | 56156522 | A  * | 12/1981 |
| JP | 07-238940 | | 9/1995 |
| JP | 2011-026432 | | 2/2011 |
| WO | 2006/051671 | | 5/2006 |

* cited by examiner

*Primary Examiner* — Phillip A Johnson  
(74) *Attorney, Agent, or Firm* — Browdy and Neimark, PLLC

(57) ABSTRACT

A rolling-contact bearing has an outer ring, an inner ring or a shaft rotational relative to the outer ring and a full complement of rollers disposed for rotation between the outer ring and the shaft. A semisolid gel-like lubricant composed of a mixture of a gelling agent and lubricating oil is packed into interstices or gaps between the outer ring and the rollers and among the adjacent rollers to retain surely the rollers on a circular inside surface of the outer ring. The gel-like lubricant is composed of the lubricating oil of mineral oil or base oil, and a powdery oil gelling agent based on amino acids.

5 Claims, 3 Drawing Sheets

FULL COMPLEMENT ROLLER BEARING PACKED WITH GEL-LIKE LUBRICANT

FIELD OF THE INVENTION

The present invention relates to a rolling-contact bearing available with or without an inner ring and having a full complement of rollers, commonly referred to as full complement roller bearing. More particularly, the present invention related to a rolling-contact bearing in which a full complement of rollers is arranged between an outer ring and a shaft used as an inner ring and gel-like lubricant fills in gaps or interstices between the outer ring and the rollers to keep the rollers inside the outer ring.

BACKGROUND OF THE INVENTION

With conventional full complement roller bearings with no cage or retainer, a full complement of rollers are coated with grease and charged inside an outer ring to be retained inside the outer ring by adhesion of the grease. The full complement roller bearings constructed as stated earlier has a major problem in which the rollers are liable to fall away apart from the outer ring while in handling because of less in retention or retentive faculty of grease.

A full complement of rollers is known as shown in, for example in Japanese Publication No. H46-9082 in which a retaining material charged around the rollers solidifies to join together the rollers. The rollers are disposed circularly and joined together with adhesion of the retaining material which fills in the gaps or interstices among the rollers. The retaining material is mainly composed of synthetic resin blended with inorganic solid lubricant. Blending the solid lubricant is to give the retaining material more lubricating performance.

Another prior roller bearing is disclosed in, for example Japanese Laid-Open Patent Application No. H07-238 940 in which many rollers are arranged over a race lying on an inside circular surface of an outer ring and a solid lubricant is charged around the rollers to join the rollers together with keeping individual rollers in place at preselected intervals spaced away from each other. The solid lubricant is a lubricating composition of a blend of ultrahigh molecular weight polyolefin with grease.

International publication No. WO 2006/051 671 discloses a thermoreversible gel-like lubricating composition composed of a mineral oil and/or synthetic liquid lubricating base oil, and a bisamide and/or a monoamide. The composition normally is in a form of semi-solid gel as with grease, but turns into homogeneously melted status with no deposition of foreign materials when encountering a local high-temperature area in for example a sliding contact site. The composition dissolved as stated earlier has much energy-saving performance based on excellent low frictional characteristics. Thus, the thermoreversible gel-like lubricating composition has the lubricating performance which wouldn't be expected in grease.

In Japanese Laid-Open Publication No. 2011-26 432, there is disclosed a lubricant composition and a rolling-contact bearing using the same. The lubricant composition is made semisolid with using gelling agents to increase the fluidity and fluid-restoration reversibility. The rolling-contact bearing using the lubricant composition prepared as stated earlier is improved in prolonged service life and less in torque. With the prior lubricant composition, base oil is thickened with only using amino acid-based gelling agent and benzylidene sorbitol-based gelling agent. The mass ratio between amino acid-based gelling agent and benzylidene sorbitol-based gelling agent is 20-80%:80-20%. The rolling-contact bearing using the lubricant composition is composed of an inner ring, outer ring and many rolling elements disposed between the inner and outer rings for free rotation. The lubricant composition is packed in an inside space defined between the inner ring and the outer ring.

Meanwhile, grease used in the full complete roller bearing isn't intended to just hold or retain the rollers inside the outer ring, but envisioned mainly serving lubricating function for the rollers. With the prior roller bearing in which a full complete of rollers are retained inside the outer ring with adhesion of grease applied over the inner surface of the outer ring, there still remains a major challenge in which since grease is inferior in retention or retentive faculty, the rollers are liable to fall away apart from the outer ring on assembly of the outer ring with a full complement of rollers into the inner ring or the shaft, or while in transit, for example while in assembling operations for shock absorbers, swing arms and so on, thereby resulting in obstacles to easy assembly and transit operations. With the roller bearing constructed as stated earlier, a full complement of rollers is retained inside the outer ring with usually getting a solid lubricant to function as the retainer. The greater is the force of the solid lubricant to retain the rollers, the greater is the torque needed to actuate the roller bearing. This increase in torque is adverse to operations in the roller bearing and, therefore, the solid lubricant poses another challenge.

SUMMARY OF THE INVENTION

The present invention has as its primary object to overcome the problems as described just above and more particular to provide a rolling-contact bearing, for example a needle bearing having a full complement of rollers in which a gel-like lubricant is used to increase a retentive faculty to adhere the rollers to an outer ring, as compared with the prior retention to keep the rollers with the use of adhesion of grease, thereby retaining surely the rollers between an outer ring and an inner ring. More particularly, the present invention provides a full complete roller bearing in which a semisolid gel-like lubricant joined together with the rollers is adhered to an inside surface of the outer ring to place the rollers along the inside circular surface of the outer ring, thereby keeping surely the rollers inside the outer ring with the positive retentive faculty, much improving the working performance while in assembly of the roller bearing with a full complement of rollers and/or while in transit.

The present invention is concerned with a rolling-contact bearing comprising an outer ring and a full complement of rollers disposed on a circular inside surface of the outer ring, and wherein a semisolid gel-like lubricant composed of a mixture of lubricating oil and a gelling agent is poured or packed into interstices or gaps left between the outer ring and the rollers and among the rollers to retain the rollers inside the outer ring.

In the present invention, a full complement roller bearing is provided in which the mixture is composed of the gelling agent of from 4% to 10% by weight and the lubricating oil and the mixture turns into the semisolid gel-like lubricant to retain the rollers on the circular inside surface of he outer ring. With the gel-like lubricant, the gelling agent of for example less than 10% by weight, more preferably 5% by weight, is blended with the lubricating oil to turn into the semisolid gel befitted to retain the rollers. Moreover, the lubricating oil is a mineral oil or a synthetic oil having a kinematic viscosity in the range of from 100 cSt to 580 cSt (=mm$^2$/s, centistokes) at 40° C.

In the present invention, a full complement roller bearing is provided in which the gel-like lubricant to retain the rollers, after having experienced a shearing force caused by rotation of a shaft relative to the outer ring, loses its three dimensional network structure because of the external shearing force to turns into a lubricant added to fluidity. Moreover, the gel-like lubricant is packed into the interstices or gaps left between the outer ring and the rollers and among the rollers in a depth or radial thickness equivalent to a diameter of the roller extending from the inside surface of the outer ring towards a rotational center of the bearing. Further, the gelling agent is composed of an oil gelling agent having a main backbone of glutamic acid in acidic amino groups, and is an organic compound of dibutyl ethylhexanoyl glutamide.

With the full complement roller bearing constructed as stated earlier, the gel-like lubricant to retain the rollers is poured or packed circularly inside the circular inside surface of the outer ring so as to bury the rollers in the gel-like lubricant. As a result, there is no need of any interim or tentative shaft to keep the rollers from falling away apart from the outer ring while in transit and/or in assemblage of the inner ring or shaft into the outer ring so as to ensure smooth assembling work. With the full complement roller bearing constructed according to the present invention, moreover, when the outer ring after having fit over the inner ring or shaft is forced to turn relative to the shaft, the gel-like lubricant undergoes any shearing force caused by the relative turning of the out ring to lose the network structure of the gel, gaining more fluidity or liquidity. Thus, the resistance against the rotation of the shaft relative to the outer ring is lost to make the smooth rotation easier. With shell-type full complement needle bearing, the rollers are surely and easily kept retained on the circular inside surface of the outer ring whenever the gel-like lubricant undergoes no shearing force. In other words, the full complement roller bearing with the gel-like lubricant to retain the rollers has doubled in retentive faculty to the rollers compared with the prior full complement roller bearing using grease to retain the rollers on the outer ring. The rotation of the outer ring would be kept better for a prolonged service life after assembled into the bearing so long as the lubricating oil is chosen adequately.

DETAILED DESCRIPTION OF THE EMBODIMENTS

Figure 1:
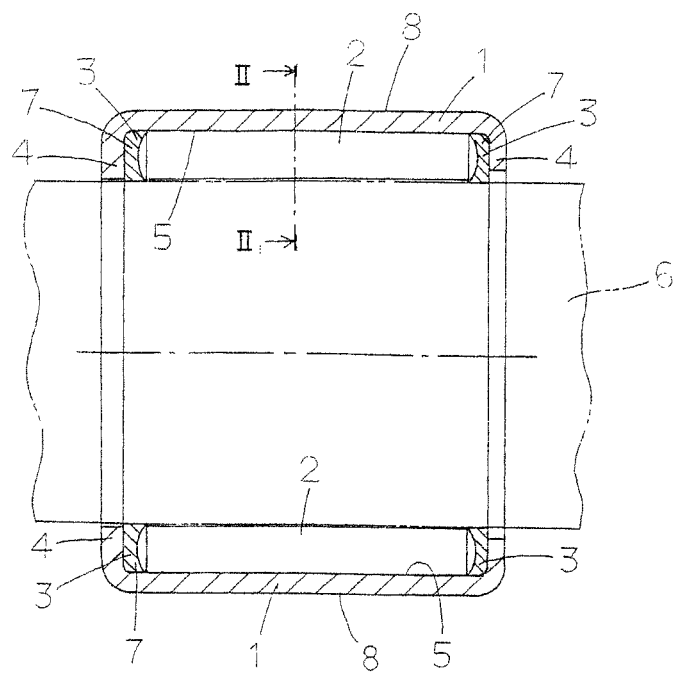
FIG. 1 is a view in axial section of a full complement roller bearing packed with a gel-like lubricant to retain the rollers inside the bearing according to the present invention.

A rolling-contact bearing with a full complement of rollers packed with a gel-like lubricant to retain the rollers of the present invention will be explained hereinafter in detail with reference to the accompanying drawings. The full complement roller bearing of the present invention is befitted for incorporation in the bearings used in a diversity of machines having a shaft serving as an inner ring. With a shell-type full complement needle bearing shown here, a mixture of lubricating oil and a gelling agent was first charged into interstices or gaps 7 remaining between rollers 2 and between the roller 2 and an outer ring 1. The mixture was heated and then cooled down to get gelled to produce a semisolid gel-like lubricant 3 which in turn coagulates or solidifies together with the rollers 2 to mold integrally with the rollers 2 to be retained or held inside the outer ring 1.

In versions 1 to 8 explained in detail later, a mixture of mineral oil or synthetic oil for a lubricating oil and a gelling agent was kept at an elevated temperature of 130-150° C. over from 10 to 30 minutes and then cooled down to solidify into the gel-like lubricant 3. The gel in this specification is referred as a thermoreversible gel having a dispersive network structure that remains in semisolid state with no fluidity at ambient temperatures, for example at 40° C., but turns at an elevated temperature into a liquid rich in fluidity and returns or solidifies at a lower temperature to the semisolid gel again.

With the full complement roller bearing of the present invention, the gelling agent to be mixed with the lubricating oil of mineral oil or synthetic oil to prepare the gel lubricant 3 is composed of, for example a powdery oil gelling agent based on amino acids, that is, an oil gelling agent having a main backbone of glutamic acid in acidic amino groups. The oil gelling agent based on amino acids, far different from waxes of layered structure, is an organic compound composed of dibutyl ethylhexanoyl glutamide which forms nano-sized fibrous networks to get gelled.

The gel-like lubricant 3 used in the full complement roller bearing of the present invention is the gelled oil in which the lubricating oil is admixed with the gelling agent prepared as stated earlier. The gel-like lubricant 3 is circularly applied on a circular inside surface 5 or circular race of the outer ring 1 in a radial depth substantially equal to a diameter of the roller 2 lying in rolling contact with the circular race 5 of the outer ring 1 to thereby bury the roller 2 in the gel-like lubricant 3. The gel-like lubricant 3 applied or packed inside the outer ring 1 is raised more radially inwards than an inscribed circle diameter of the rollers 2 with an inner ring or shaft 6 to form a circular layer of the gel-like lubricant 3 over the circular surfaces of the rollers 2 to enhance a retentive faculty of the gel-like lubricant 3 to retain the rollers 2 inside the outer ring 1. An excessive amount of the gel-like lubricant 3 raised above the circular surfaces of the rollers 2 lying on the inscribed circle diameter of the rollers 2, because of semisolid state, may be easily removed or chipped off from the outer ring 1 while in assembling the full complement roller bearing with the inner ring or shaft 6. The gel-like lubricant 3 composed of the liquid mixture of the lubricating oil and the gelling agent is poured or packed into either of the interstices or gaps 7 between the outer ring 1 and the rollers 2 and the interstices or gaps 7 among the rollers 2, where the liquid mixture is heated and then cooled to turn into gelation or solidification to make the rollers 2 integral with the semisolid lubricant.

In preparation of the gel-like lubricant 3, the rollers after coated with the liquid mixture of the gelling agent and the lubricating oil are disposed on the circular inside surface 5 of the outer ring 1. Thus, it will be considered that the workability in the gel-like lubricant 3 of the present invention is virtually the same as the conventional preparation of the grease application to retain the rollers. The liquid mixture prior to gelation is prepared by blending the lubricating oil and the gelling agent of less 10% by weight, preferably 5% by weight. The blend of the lubricating oil and the gelling agent of 5% by weight, after the cooling following the heat, turns into the gel-like lubricant 3 having the retentive faculty sufficient to retain the rollers 2 inside the outer ring 1. The lubricating oil preferred to be used is mineral oil or synthetic oil having kinematic viscosity of from 100 cSt to 680 cSt (=$mm^2/s$, centistokes) at 40° C. With the gel-like lubricant 3, the gelling agent in liquid or sol lubricating oil forms nano-sized fibrous networks to get the lubricating oil gelled. The fibrous gel network structures, after having experienced any shearing force, are destroyed to gain more fluidity or liquidity. Thus, the gel-like lubricant 3, when having undergone the shearing force owing to any torque applied externally to the bearing, gains fluidity to make certain of the lubricating faculty in the full complement roller bearing, thereby ensuring the revolution of the outer ring 1 relative to the shaft 6 even with low torque.

Installation of the rollers 2 together with the gel-like lubricant 3 is carried out as follows. First, the rollers 3, after mixed with the gel-like oil the gel-like lubricant 3, are placed on the circular inside surface 5 of the outer ring 1 in sequence spaced at desired intervals. Then, the gel-like lubricant 3 is packed into the interstices or gaps 7 remaining among the rollers 2 and/or between the rollers 2 and the outer ring 1. They in combination stand in an oven at temperatures range of from 130 to 150 for, for instance 20 minutes to heat the gel-like lubricant 3. Once air cooled, the lubricant 3 gets gelled as it cools. Finally, the adhering extra gel-like lubricant is removed to finish the full complement roller bearing. On the placement of the rollers 2 on the circular inside surface of the outer ring 1, there is no fear of disorder of the rollers 2 and falling away from the outer ring 1. Thus, the workability in the gel-like lubricant 3 is substantially the same as the prior art in grease application to retain the rollers.

The mixture of the gelling agent and the lubricating oil, as it cools after heated, loses the fluidity and turns into the semisolid gel-like lubricant 3 to retain the rollers 2 inside the outer ring 1. The gel-like lubricant 3 developed for the full complement roller bearing has the improved retentive faculty to keep in place the rollers 2, especially twice or above the adhesion of the grease to retain the rollers 2 used in the conventional roller bearings, so that the rollers 2 are more difficult to fall away apart from the outer ring 1 while in handling of the full complement roller bearing. The gel-like lubricant 3 in itself, when having undergone any shearing force, adds to the fluidity and correspondingly renders less the torque encountered while in operation of the bearing, contributing the energy-saving. The gel-like lubricant 3 of the present invention is less in retentive faculty to hold the rollers 2, compared to the conventional solid lubricants, and further gets fluidity under the influence of any shearing force. Even if the rollers 2 are laid slightly askew with respect to the outer ring 1 upon the molding or placement of the rollers 2 together with the mixture of the gelling agent and the lubricating oil, the rollers 2 may line up in very orderly fashion all on its own as the gel-like lubricant 3 gets fluidity under the application of the shearing force. Thus, there is no practical issue about the rollers 2 are in slightly askew posture relative to the outer ring 1.

After the rollers 2 has been placed inside the outer ring 1 and the gel-like lubricant 3 has been packed inside the outer ring 1, the full complement roller bearing assembled as stated just earlier is installed over the inner ring or shaft 6. Revolving the outer ring 1 relative to the shaft creates the shearing force inside the gel-like lubricant 3 to add the fluidity in the gel-like lubricant 3. In this condition, it is needed to control adequately the kinematic viscosity in the lubricating oil to protect the runny lubricant 3 against unintended or undesired leak out of the full complement roller bearing. As an alternative, provisions may be made to resupply or furnish the lubricating oil prior to or while in operating the full complement roller bearing to keep constantly the lubricating faculty in the bearing better in case the lubricating faculty in the full complement roller bearing gets lost as a result the gel-like lubricant 3 leaks out. To this end, an oiling port, although not shown, is made on, for example a flange portion of the outer ring 1 to resupply the lubricating oil into the full complement roller bearing. It is preferred to plug normally the oiling port in the outer ring 1 with any caps or the like.

Figure 3:
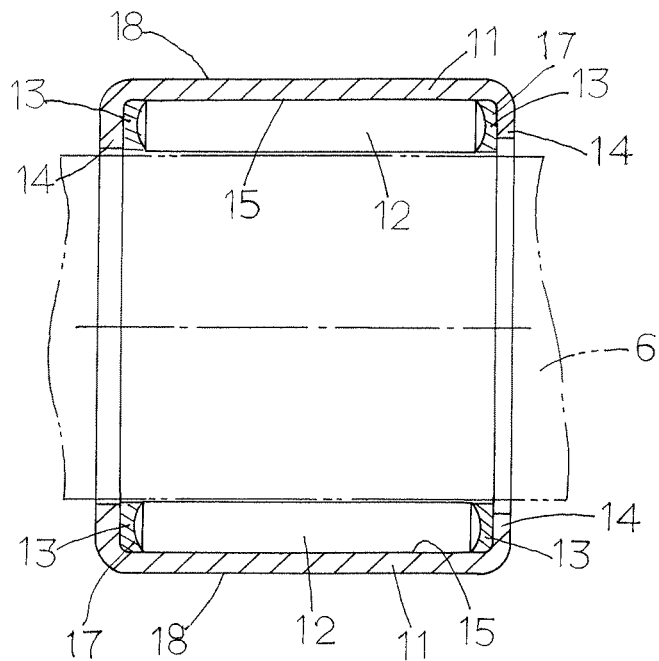
FIG. 3 is a view in axial section of a conventional bearing analogous in construction to the full complement roller bearing of the present invention.

On production of the full complement roller bearing of the present invention, the workability in the placement of the rollers 2 on the circular inside surface 5 of the outer ring 1 is substantially the same as the conventional and further the fibrous network structure will require only a minor amount of the gelling agent. Where same in volume, the gel-like lubricant in the present invention affords to have more lubricant component compared with the conventional solid lubricant. The full complement roller bearing of the present invention is more versatile in available temperature range and allowable rpm in the gel-like lubricant, compared with the conventional bearings in which the rollers are retained with the solid lubricant. Moreover, the full complement roller bearing using the gel-like lubricant of the present invention can expect a remarkable reduction in costs compared with the conventional bearings in which the rollers are retained with the solid lubricant. The existing full complement roller bearing using grease to retain the rollers is shown in FIG. 3 in which an outer ring 11 is shaped to have axially opposite flanges 14 and rollers 12 are placed on a circular inside surface 15 of the outer ring 11. Grease 13 is packed to fill in interstices or gaps 17 remaining between the outer ring 11 and the rollers 12 and among the rollers 12.

Evaluation results of retention to adhere the rollers to the outer ring in the full complement roller bearing of the present invention will be explained below with reference to FIGS. 4 to 6.

Figure 2:
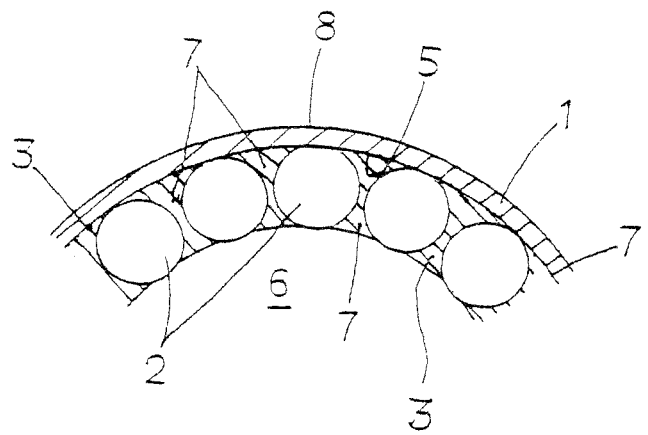
FIG. 2 is a fragmentary view in section of the full complement roller bearing, the view being taken along the plane of the line •-• of FIG. 1.

Versions 1 to 8 show the double shell-type full complement needle bearings illustrated in FIG. 1 and FIG. 2 in which the rollers 2 are retained with the gel-like lubricant 3 prepared according to the present invention. Comparisons 1 and 2 show the conventional double shell-type full complement needle bearings illustrated in FIG. 3 in which the rollers 2 are retained with grease. In all versions 1 to 8, the gelling agent of 5% by weight was blended in the lubricating oil.

Bearings used in versions and comparisons had principal dimensions: the inscribed circle diameter of 17 mm, the outside diameter of 24 mm and the width of 20 mm.

With the products constructed according to the present invention, the rollers 2 admixed with gelled oil of the gel-like lubricant 3 were placed on the circular inside surface 5 of the outer ring 1.

Lubricating oil was mixed with gelling agents different in kinematic viscosity at 40° C. as listed in Table 1. The resulting mixtures were heated and then cooled down to get solidified to produce the gel-like lubricant 3.

With the mixture to produce the gel-like lubricant 3, the gelling agent of 5% by weight was mixed or blended with lubricating oil. The gel-like lubricant 3 was packed to fill in interstices or gaps 7 remaining between the outer ring 1 and the rollers 2 and among the rollers 2 in a depth or radial thickness as large as the diameter of the roller 2.

TABLE 1

(In versions 1 to 8, the gelling agent of 5% by weight was blended in the lubricating oil.)

|  | Lubricant to retain roller | Lubricating oil or base oil | Kinematic viscosity (40° C.) cSt (mm²/s) |
|---|---|---|---|
| Version 1 | Gel-like lubricant | Mineral oil | 100 |
| Version 2 | Gel-like lubricant | Mineral oil | 220 |
| Version 3 | Gel-like lubricant | Mineral oil | 320 |
| Version 4 | Gel-like lubricant | Mineral oil | 460 |
| Version 5 | Gel-like lubricant | Synthetic oil | 150 |
| Version 6 | Gel-like lubricant | Synthetic oil | 220 |
| Version 7 | Gel-like lubricant | Synthetic oil | 460 |
| Version 8 | Gel-like lubricant | Synthetic oil | 680 |
| Comparison 1 | Grease | Mineral oil | 130 |
| Comparison 2 | Grease | Mineral oil | 1070 |

As seen in Table 1, the lubricant to retain the rollers in comparisons 1 and 2 was grease made of mineral oil. The kinematic viscosity at 40° C. of the mineral oil was 130 cSt in comparison 1 and 1070 cSt in comparison 2.

With the versions 1 to 4, the lubricant used to retain the rollers was the gel-like lubricant prepared of different mineral oils whose kinematic viscosities were 100 cSt, 220 cSt, 320 cSt and 4600 cSt. In other versions 5 to 8, the lubricant to retain the rollers was the gel-like lubricant prepared of different polyolefin synthetic oils whose kinematic viscosities were 150 cSt, 220 cSt, 460 cSt and 6800 cSt.

The method to evaluate the retentive faculty in the full complement roller bearings was carried out as follows. Any weight was hit against the circular outside surfaces 8, 18 of the outer rings 1, 11 to evaluate the retentive faculty or impact energy needed to get the rollers 2, 12 broken away from the outer rings 1, 11.

The weight used in the evaluation method was a roughly spherical body having a mass of 53.4 g and a diameter of about 28 mm.

The weight got plummeted as high as 150 mm above the outside surface of the outer ring 1 twice successively and then the height above the outer ring 1 was increased in increments at an interval of 10 mm at a time.

Evaluations between the present products and the conventional grease products were determined based on a potential energy of the weight with respect to the height of the weight when the rollers 2 were broken away from the outer ring 1.

Figure 4:
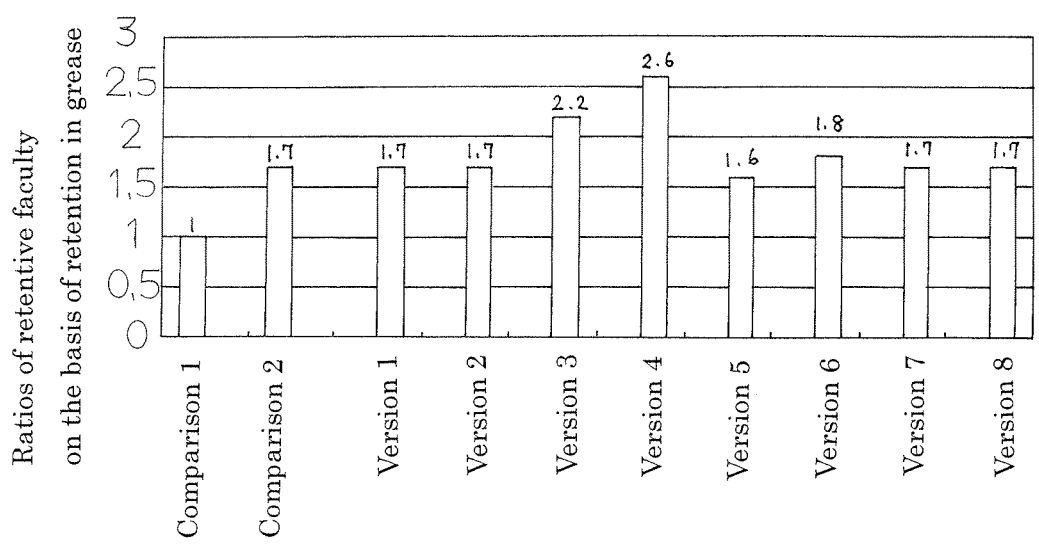
FIG. 4 is a graphic representation showing retentive faculties in keeping the rollers in the roller bearing evaluated among versions 1 to 8 and comparisons 1 and 2, which were all heated at 150° C. for 15 minutes and then cooled down.

Referring to FIG. 4, there is shown retentive faculties to keep the rollers evaluated among versions 1 to 8 and comparisons 1 and 2.

The abscissa or x-coordinate in FIG. 4 shows different versions 1 to 8 and the comparisons 1 and 2 while the ordinate or y-coordinate shows ratios of retentive faculty to retain the rollers.

With the evaluation results of retention to adhere the rollers to the outer ring shown here, the versions 1 to 8 used the gel-like lubricant 3 in which the gelling agent was heated at 150° C over 15 minutes and then cooled down to turn into the semisolid state. In contrast, the comparisons 1 and 2 used grease to retain the rollers.

When rendering the ratio 1 to the comparison 1, the comparison 2 showed the ratio of 1.7. Mineral oil used in the comparison 2 had the kinematic viscosity of 1070 cSt at 40° C. This means the mineral oil isn't of practical use in spite of high retention because the revolution of the outer ring relative to the inner ring or the shaft might encounter the high resistance.

The versions 1, 2, 7 and 8 showed the ratio of 1.7, the version 5 was the ratio of 1.6, the version 6 was the ratio of 1.8, the version 3 was the ratio of 2.2 and the version 4 had the ratio of 2.6.

Figure 5:
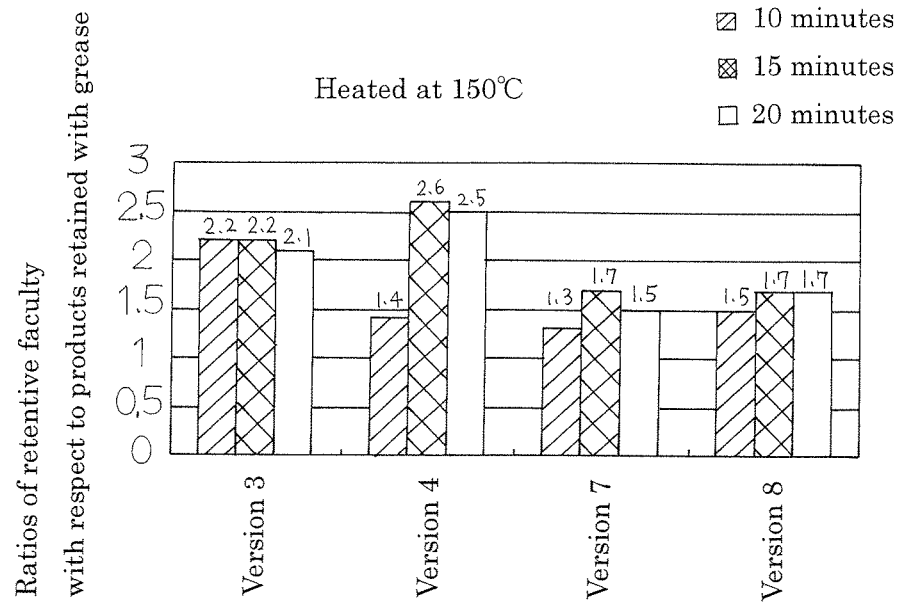
FIG. 5 is a graphic representation showing retentive faculties in keeping the rollers in the roller bearing evaluated among versions 3, 4, 7 and 8 and comparisons 1 and 2, which were heated at 150° C. for 10 minutes, 15 minutes and 20 minutes and then cooled down. In the evaluation, the product using grease as a retaining material is envisioned to be 1 in retention.

In FIG. 5, there are shown evaluation results of retention in the versions 3, 4, 7 and 8. Any of these versions used the gel-like lubricant in which the gelling agent was heated at 150° C. for 10 minutes, 15 minutes and 20 minutes and then cooled down.

As for the version 3, the ratios of the retention were 2.2 when heated for 10 minutes, 2.2 when heated for 15 minutes and 2.1 when heated for 20 minutes.

As for the version 4, the ratios of the retention were 1.4 when heated for 10 minutes, 2.6 when heated for 15 minutes and 2.5 when heated for 20 minutes.

As for the version 7, the ratios of the retention were 1.3 when heated for 10 minutes, 1.7 when heated for 15 minutes and 1.5 when heated for 20 minutes.

As for the version 8, the ratios of the retention were 1.5 when heated for 10 minutes, 1.7 when heated for 15 minutes and 1.7 when heated for 20 minutes.

It was proved that any of these versions was better in retentive faculty to retain the rollers compared with grease.

Figure 6:
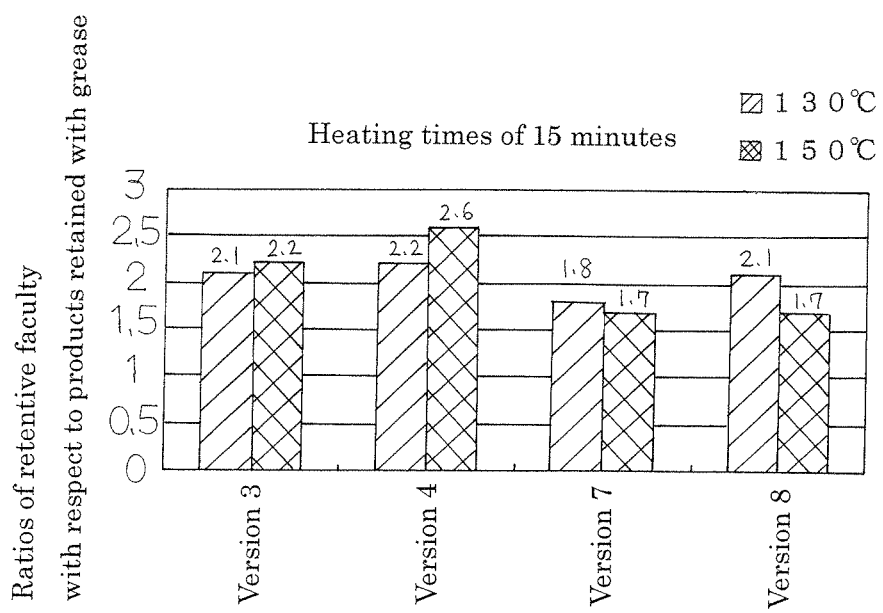
FIG. 6 is a graphic representation showing retentive faculties in keeping the rollers in the roller bearing evaluated among versions 3, 4, 7 and 8, which were heated at 130° C. and 150° C. for 15 minutes and then cooled down. In the evaluation, the product using grease as a retaining material is envisioned to be 1 in retention.

In FIG. 6, there are shown evaluation results of retention in the versions 3, 4, 7 and 8. Any of these versions used the gel-like lubricant in which the gelling agent was heated at different temperatures of 130° C. and 150° C. for 15 minutes and then cooled down.

As for the version 3, the ratios of the retention were 2.1 when heated at 130° C. and 2.2 at 150° C. As for the version 4, the ratios of the retention were 2.2 when heated at 130° C. and 2.6 at 150° C.

As for the version 7, the ratios of the retention were 1.8 when heated at 130° C. and 1.7 at 150° C.

As for the version 8, the ratios of the retention were 2.1 when heated at 130° C. and 1.7 at 150° C.

Thus, it was found that any of these versions was better in retentive faculty to retain the rollers compared with grease.

It was proved that the solid lubricant of the gel-like lubricant 3, though different depending on the kinematic viscosity of base oil, molding temperature, heating time, with or without any jig, was from about 1.3 to 2.6 times higher in retentive faculty, compared with the conventional products in which the rollers were retained by only the adhesion of grease.

The evaluation results proved that the most effective retention to keep in place the rollers was ensured by the lubricant in the version 4 in which the mineral oil having the kinematic viscosity of 460 cSt was heated at 150° C. for 15 minutes and then cooled, thereby turning into the solid state.

What is claimed is:

1. A rolling-contact bearing comprising an outer ring and a full complement of rollers disposed on a circular inside surface of the outer ring,
   wherein a semisolid gel-like lubricant composed of a mixture of lubricating oil and a gelling agent is poured or packed into interstices or gaps left between the outer ring and the rollers and among the rollers to retain the rollers inside the outer ring, and
   wherein the gelling agent is composed of an oil gelling agent having a main backbone of glutamic acid in acidic amino groups, and is an organic compound of dibutyl ethylhexanoyl glutamide.

2. A rolling-contact bearing constructed as defined in claim 1, wherein the mixture is composed of the gelling agent of from 4% to 10% by weight and the lubricating oil, and wherein the mixture turns into the semisolid gel-like lubricant to retain the rollers on the circular inside surface of the outer ring.

3. A rolling-contact bearing constructed as defined in claim 1, wherein the lubricating oil is a mineral oil or a synthetic oil having a kinematic viscosity in the range of from 100 cSt to 580 cSt at 40° C.

4. A rolling-contact bearing constructed as defined in claim 1,
   wherein the gel-like lubricant to retain the rollers, after having experienced a shearing force caused by rotation of a shaft relative to the outer ring, turns into a fluid lubricant.

5. A rolling-contact bearing constructed as defined in claim 1,
   wherein the gel-like lubricant is packed into the interstices or gaps left between the outer ring and the rollers and among the rollers in a depth or radial thickness equivalent to a diameter of the roller extending from the inside surface of the outer ring towards a rotational center of the bearing.

* * * * *